United States Patent
Hughes et al.

(10) Patent No.: US 7,468,173 B2
(45) Date of Patent: Dec. 23, 2008

(54) METHOD FOR PRODUCING NITROGEN TO USE IN UNDER BALANCED DRILLING, SECONDARY RECOVERY PRODUCTION OPERATIONS AND PIPELINE MAINTENANCE

(75) Inventors: William James Hughes, Bixby, OK (US); Mark Dunbar, Tulsa, OK (US)

(73) Assignee: Sunstone Corporation, Oklahoma City, OK (US)

( * ) Notice: Subject to any disclaimer, the term of this patent is extended or adjusted under 35 U.S.C. 154(b) by 887 days.

(21) Appl. No.: 10/786,756

(22) Filed: Feb. 25, 2004

(65) Prior Publication Data

US 2005/0186130 A1  Aug. 25, 2005

(51) Int. Cl.
*C01B 21/00* (2006.01)
(52) U.S. Cl. .................................. 423/351
(58) Field of Classification Search ............ 423/351
See application file for complete search history.

(56) References Cited

U.S. PATENT DOCUMENTS

| | | |
|---|---|---|
| 1,588,258 A | 6/1926 | Metzger |
| 2,786,652 A | 3/1957 | Wells .......................... 255/24 |
| 3,286,778 A | 11/1966 | Jackson ...................... 175/69 |
| 3,301,323 A | 1/1967 | Parsons ......................... 166/1 |
| 3,535,074 A | 10/1970 | Nakashima ..................... 23/2 |
| 4,136,747 A | 1/1979 | Mallory et al. ................ 175/66 |
| 4,579,723 A | 4/1986 | Weltmer et al. ............. 423/219 |
| 4,814,156 A | 3/1989 | Pinto .......................... 423/351 |
| 5,077,029 A | 12/1991 | Schaub ....................... 423/351 |
| 5,238,670 A | 8/1993 | Louise et al. ............... 423/351 |
| 5,320,818 A | 6/1994 | Garg et al. .................. 423/351 |
| 5,348,592 A | 9/1994 | Garg et al. .................. 148/208 |
| 5,478,534 A | 12/1995 | Louise et al. ............... 422/188 |
| 5,480,682 A | 1/1996 | Kaiser et al. ................ 427/495 |
| 5,607,572 A | 3/1997 | Joshi .......................... 205/763 |
| 5,663,121 A | 9/1997 | Moody ....................... 507/102 |
| 5,695,731 A | 12/1997 | Domergue et al. .......... 423/351 |
| 5,728,354 A | 3/1998 | Domergue et al. .......... 422/177 |
| 5,775,442 A | 7/1998 | Speed .......................... 175/48 |
| 5,928,519 A | 7/1999 | Homan ....................... 210/741 |
| 6,128,919 A | 10/2000 | Daus et al. .................... 62/624 |
| 6,168,774 B1 | 1/2001 | Van den Sype ............. 423/351 |
| 6,206,113 B1 | 3/2001 | Michael ........................ 175/71 |
| 6,234,258 B1 | 5/2001 | Karigan ........................ 175/66 |
| 6,274,102 B1 | 8/2001 | Van den Sype ............. 422/211 |
| 6,328,118 B1 | 12/2001 | Karigan et al. ................ 175/66 |
| 6,494,262 B1 | 12/2002 | Chitty ......................... 166/311 |
| 2003/0075230 A1 | 4/2003 | Chitty ......................... 166/90.1 |

FOREIGN PATENT DOCUMENTS

| | | |
|---|---|---|
| EP | 0 259 041 | 3/1988 |
| GB | 2 186 682 | 8/1987 |
| GB | 2 332 632 | 6/1999 |
| WO | WO 94/29566 | 12/1994 |

*Primary Examiner*—Edward M Johnson
(74) *Attorney, Agent, or Firm*—Duke Yee; Rudolf Siegesmund; Grant Rodolph (57) ABSTRACT

The invention uses a feed of atmospheric air and mixes the air with hydrogen. The hydrogen and air mixture is fed into a catalytic reactor where a deoxygenation reaction occurs. The deoxygenation reaction uses a platinum catalyst to produce water from oxygen and hydrogen. The nitrogen passes through the catalytic reactor without reacting with the hydrogen, the oxygen, or the water. The water is separated from the nitrogen in a dryer. The nitrogen may then be used in drilling and production operations. The water is fed into an electrolyzer where an electrolysis reaction occurs. The electrolyzer passes an electrical current through the water to produce gaseous oxygen and hydrogen. The hydrogen is recycled back to the catalytic reactor and the oxygen may be vented or sold.

23 Claims, 5 Drawing Sheets

METHOD FOR PRODUCING NITROGEN TO USE IN UNDER BALANCED DRILLING, SECONDARY RECOVERY PRODUCTION OPERATIONS AND PIPELINE MAINTENANCE

FIELD OF THE INVENTION

The present invention is a method for separating air into gaseous oxygen and gaseous nitrogen, and using the nitrogen to induce under balanced drilling conditions, to improve the production of oil in secondary recovery operations, or to clean a pipeline. In all applications, the oxygen that is produced is considered a by-product that can be sold or vented.

BACKGROUND OF THE INVENTION

Traditional drilling operations employ the circulation of a weighted drilling fluid (i.e. mud) such that the hydrostatic pressure of the drilling fluid contained in a well bore is equal to or greater than the pressure exerted by the formation being drilled. Traditional drilling can be preferable because the weight of the mud column prevents flammable hydrocarbons from entering the well bore. However, traditional drilling also creates operational challenges due to a positive pressure differential between the well bore and the formation. Examples of operational challenges include differential sticking of the drill pipe, reservoir damage due to filter cake, increased costs of well completion, and reduced permeability and production from the formation.

In response to these challenges, a drilling method called under balanced drilling has been developed. In under balanced drilling, the hydrostatic pressure of the drilling fluid is less than the pore pressure of the formation. Under balanced drilling has the potential to be hazardous because oil and gas could blowout from the well bore, releasing a large amount of flammable hydrocarbons into the atmosphere. However, improvements in blowout prevention equipment have made it possible to drill safely in an under balanced condition. Benefits of under balanced drilling include increasing the drilling rate, limiting lost circulation, limiting reservoir damage, reducing differential sticking, and reducing the cost of well completions. Under balanced drilling can be beneficial when drilling directional and horizontal wells that target oil and gas reservoirs for production purposes.

To accomplish under balanced drilling conditions, the weight of the drilling fluid must be reduced so that the hydrostatic pressure within the well bore is less than that of the formation. Standard methods of reducing weight of the drilling fluid include replacing the drilling fluid with a gas (i.e. air, nitrogen or natural gas drilling), infusing the drilling fluid with a gas to reduce the density of the mud (i.e. gas-cut mud drilling), and creating a foam from a gas and a liquid and using the foam as the drilling fluid (i.e. foam drilling). In each case, under balanced drilling involves the introduction of a gas into the well bore. The gases that are used for drilling may also be used during post-drilling operations for various well-completion and production activities such as cleaning out well bores, cleaning pipelines, and reservoir injection to stimulate production in secondary recovery projects. Secondary recovery is an oilfield term used to describe any process such as the injection of gas into a reservoir to restore oil production from a subsurface formation where the primary drive mechanism and reservoir pressure have been depleted. Pipeline cleaning, also known as pigging, is the process of forcing a device called a pig that is made of hard rubber, plastic or metal and shaped like a sphere or a cylinder through a pipeline to remove condensate that collects in low places in the pipeline.

For both under balanced drilling and other gas-related oilfield applications, the traditional options for gas selection include air (79% $N_2$ and 21% $O_2$), carbon dioxide ($CO_2$), natural gas, and nitrogen ($N_2$). The oxygen in the air presents the risk of down hole fire or explosion because the oxygen can promote an explosive atmosphere when mixed with hydrocarbons within the well bore. The resulting well bore fire can be very costly and disruptive to drilling operations. Use of air or carbon dioxide also presents the risk of increased corrosion of down hole pipe and equipment, requiring expensive corrosion prohibition and treatment to the drilling or production equipment. The use of natural gas can be prohibitively expensive for sustained drilling operations and increases the risk of hazardous exposure for drilling personnel.

Of the available gas options, nitrogen provides the most benefit for under balanced drilling while presenting the fewest associated risks. Nitrogen is inert and does not create a risk of down hole fires or explosions. Nitrogen is not corrosive and does not require additional corrosion protection for the drilling or production equipment. Nitrogen is also considered relatively safe to use, as it is not flammable and does not present an undue safety risk for personnel involved in the drilling operation. Therefore, it is highly desirable to have a supply of pure nitrogen available for use during under balanced drilling, secondary recovery projects and other oilfield operations and such as pipeline pigging. If the nitrogen is generated at the well site, producing field or pipeline site, the generation of nitrogen should be cost effective in that it does not place an undue financial burden on the under balanced drilling project, the secondary recovery operation, or pipeline cleaning process.

The nitrogen producing equipment must meet other demands that are unique to drilling, production, and pipeline operations. The physical location of the drilling operation, secondary recovery project, or pipeline access point can be remote, so the nitrogen production equipment must be able to be transported to remote places. Drilling operations typically last less than three months, so the nitrogen producing equipment must be mobile enough to move from one location to another along with the drilling equipment. The nitrogen producing equipment must also be priced such that the cost of the nitrogen producing equipment does not prohibit the use of nitrogen at the well site. Thus, a need exists for a relatively inexpensive method for producing nitrogen in which the nitrogen producing equipment can be frequently moved to remote locations.

There are four generally understood methods for generating nitrogen. The first generally understood method for generating nitrogen is cryogenic distillation. Cryogenic distillation is a process in which air is condensed into a liquid form, and then separated into component streams in a distillation column. Cryogenic distillation can produce extremely pure streams of nitrogen and oxygen. Unfortunately, the cryogenic distillation process is very expensive and is generally considered cost prohibitive for drilling uses.

The second generally understood method for generating nitrogen is pressure swing adsorption (PSA). PSA is a process in which air is confined in a chamber with an adsorption catalyst and drastic and/or rapid changes in the pressure of the gas causes one type of molecule, oxygen, to adsorb onto the catalyst, while the other molecule, nitrogen, exits the catalyst chamber. The catalyst type and residence time can be varied to achieve desired purity levels of the resultant nitrogen stream. However, the PSA process is not preferable because the PSA equipment can be too large and heavy to be easily moved from one location to another. The cost of frequently compressing the air can be prohibitive as well.

The third generally understood method for generating nitrogen is membrane filtration. Membrane filtration is a process in which air passes through a membrane unit which separates some of the oxygen from the nitrogen by means of membrane pores sized to filter the larger molecule, oxygen, out of the smaller molecule, nitrogen. While the membrane quality can be varied to achieve different purity levels of nitrogen, even with the most efficient membranes sufficient oxygen remains in the nitrogen to create corrosion. Thus, the membrane filtration method does not generate nitrogen of sufficient purity to eliminate the need for corrosion inhibitors for under balanced drilling conditions.

The fourth generally understood method for generating nitrogen is combustion. Combustion reactions provide for the burning of a substance in the presence of air to consume the oxygen in the air while leaving the nitrogen intact. One drawback of combustion is that the nitrogen product is mixed with carbon dioxide as a result of the reaction. The combustion reaction can also produce other impurities such as carbon monoxide (CO) and nitrogen oxide ($NO_X$). These pollutants are undesirable in the nitrogen and must be removed in order for the nitrogen stream to be usable for under balanced drilling operations. Therefore, combustion is not an appropriate means for nitrogen production at the well site.

The prior art has previously addressed the need for nitrogen at the well site. For example, U.S. Pat. No. 6,494,262 (the '262 patent) entitled "Non-Cryogenic Production of Nitrogen for On-Site Injection in Well Clean Out" discloses a method for cleaning out a well using a compressed inert gas, such as nitrogen, produced by the non-cryogenic separation of air. The inert gas is delivered to the region of the well where undesirable matter has collected. In particular, the '262 patent provides for the inert gas to be supplied onsite by the separation of air using a membrane filtration or a PSA system. Neither membrane filtration nor PSA can provide the purity level of nitrogen required to eliminate corrosion during under balanced drilling operations. Therefore, a need exists for an improved method for producing nitrogen at a well site that is able to produce nitrogen of sufficient purity to significantly reduce the potential for corrosion in under balanced drilling operations, secondary recovery projects, and pipeline maintenance.

U.S. Pat. No. 6,206,113 (the '113 patent) entitled "Non-Cryogenic Nitrogen for On-Site Downhole Drilling and Post Drilling Operations Apparatus" discloses a method for enhancing hydrocarbon production by delivering a nitrogen rich gas produced from a non-cryogenic source into the well or reservoir where the hydrocarbons are located. In particular, the '113 patent provides for the inert gas, such as nitrogen, to be supplied onsite by separating air using membrane filtration or PSA. Neither membrane filtration nor PSA provides the purity level of nitrogen required to prevent corrosion during under balanced drilling, post drilling operations commonly known as secondary recovery and pipeline maintenance. Therefore, a need exists for an improved method for producing nitrogen at a well or field site that is able to produce nitrogen of sufficient purity to be used in under balanced drilling, secondary recovery, and pipeline maintenance operations.

The four generally understood methods for producing nitrogen are not preferable for under balanced drilling operations. The cost of the cryogenic distillation equipment is prohibitive for under balanced drilling operations. The membrane filtration units typically do not create nitrogen of sufficient purity to prevent corrosion in under balanced drilling operations. The PSA units are bulky and are not sufficiently portable for under balanced drilling operations. The combustion equipment is inexpensive and portable, but produces nitrogen that contains undesirable contaminants rendering the nitrogen unsuitable for under balanced drilling operations. Therefore, a need exists for a method of producing sufficiently pure nitrogen using mobile equipment, in which the nitrogen is suitable for under balanced drilling, secondary recovery, and pipeline maintenance operations.

Recently, a new method of removing oxygen from air, the deoxygenation reaction, has been developed. The deoxygenation reaction uses a platinum catalyst to react the oxygen in air with a hydrogen feed to produce water. The products of the deoxygenation reaction are water and nitrogen. When the correct ratios of air and hydrogen are used, virtually all of the oxygen in the air is converted into water. The resulting nitrogen/water stream can be cooled to condense the water out of the nitrogen, if desired. This process is illustrated in U.S. Pat. No. 6,274,102 (the '102 patent) entitled "Compact Deoxo System." The deoxygenation reaction in the '102 patent is useful and could be used for under balanced drilling operations. However, because oxygen is a very valuable gas, it would be more desirable for the overall process to separate the oxygen from the nitrogen instead of consuming the oxygen. The oxygen could then be sold to help finance the cost of the deoxygenation equipment, drilling equipment, drilling operations, and production operations. Therefore, a need still exists for a method for separating air into oxygen and nitrogen in which the oxygen stream is not consumed in the process.

Consequently, a need exists for a process to produce nitrogen in which the process equipment can be easily moved to remote locations. The need extends to a nitrogen production method that is able to produce nitrogen of sufficient purity for under balanced drilling, secondary recovery operation, or pipeline maintenance. A need exists for a method of producing nitrogen that is relatively contaminant-free. Finally, a need exists for producing nitrogen in which the oxygen is not consumed in the nitrogen generation process.

SUMMARY OF THE INVENTION

The present invention provides a method for the generation of nitrogen onsite for use in drilling, production, and other oilfield operations. This method employs a deoxygenation reaction to derive nitrogen ($N_2$) from a catalyzed reaction of air and hydrogen ($H_2$). The applications for use of the nitrogen include, but are not limited to, under balanced drilling, post-drilling operations, well completion, secondary recovery production operations, and pipeline maintenance. The preferred embodiment provides for all components of the process to be contained on skids that can be hauled to a drilling or field location. The skids can be loaded onto a trailer and moved from one location to another. The preferred embodiment further provides for one primary product and one by-product. The primary product of nitrogen is used during the under balanced drilling process, secondary recovery production operations, and pipeline cleaning process. The by-product of oxygen is available for commercial use or sale. The preferred embodiment provides for the sale of the oxygen by-product for medical or other distribution in such a way as to make the process more economically feasible for use in under balanced drilling, secondary recovery operations, or pipeline cleaning process by offsetting the cost of the project as a whole.

The invention feeds water into an electrolyzer where an electrolysis reaction occurs. The electrolyzer passes an electrical current through the water to separate the two elements that form water: oxygen and hydrogen. The oxygen may be vented or sold. The hydrogen is combined with atmospheric air and fed into the catalytic reactor where a deoxygenation reaction occurs. The deoxygenation reaction uses a platinum catalyst to produce water from oxygen and hydrogen. The nitrogen passes through the catalytic reactor without reacting with the hydrogen, the oxygen, or the water. The water is separated from the nitrogen in a dryer and is recycled back to the electrolyzer. The nitrogen may then be used in under balanced drilling, secondary recovery production operations, or pipeline cleaning process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
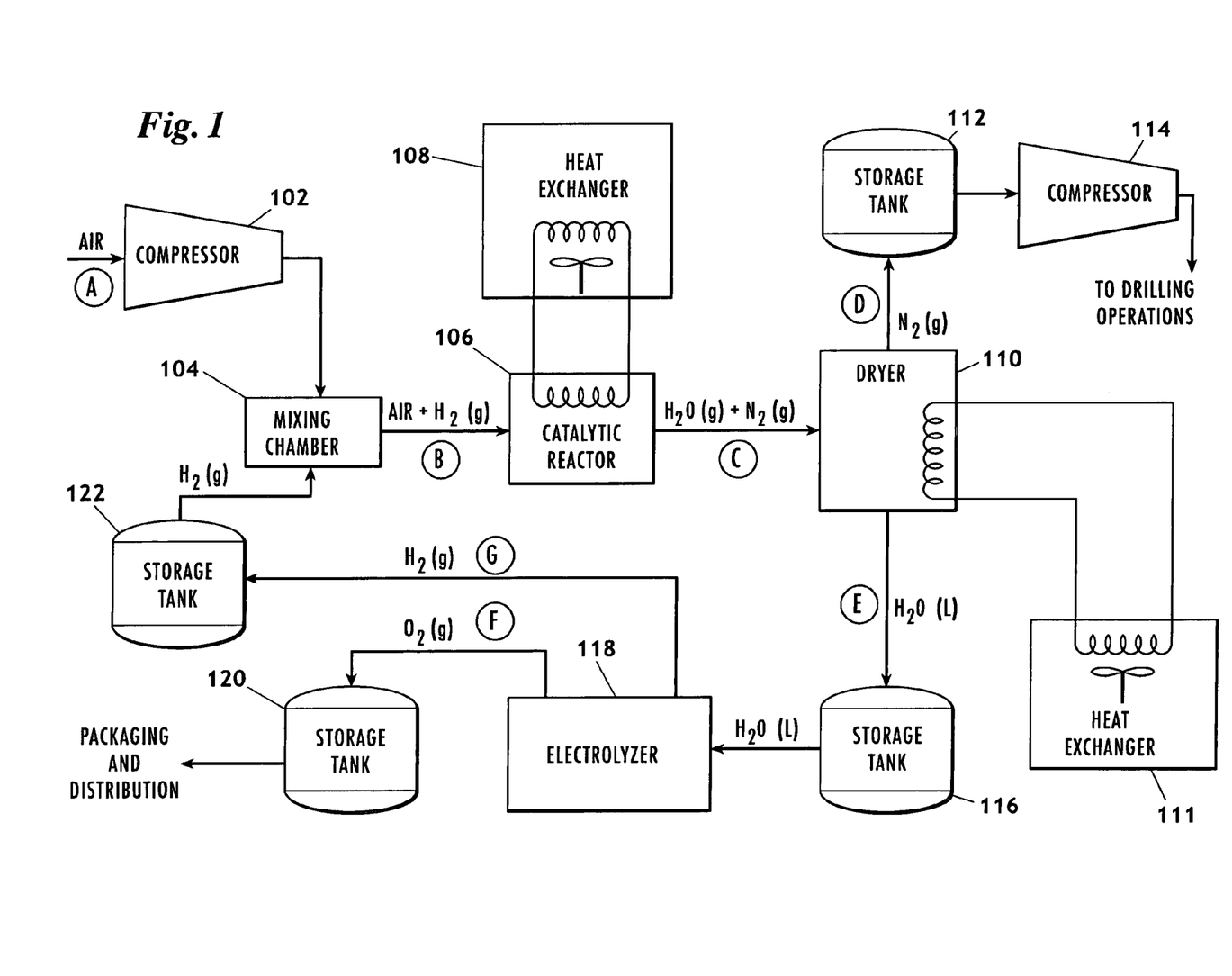
FIG. 1 is an illustration of a process flow diagram of the present invention.

The present invention is a method for separating air into oxygen and nitrogen and using the nitrogen gas for under balanced drilling operations. FIG. 1 illustrates the flow of materials through the present invention. The present invention consumes an inlet feed of air and separates the air into two effluent streams: an oxygen stream and a nitrogen stream. The equipment depicted in FIG. 1, along with the pumps, valves, and controls associated with the equipment, can be mounted on at least one structural steel skid for easy movement from one well site to another. When mounted on a skid, the present invention does not require any additional support structure other than electricity, which is readily available at the well site. The present invention does not require any support structure because the inlet air can be consumed from the atmosphere, the effluent nitrogen is stored within a storage tank until needed for the under balanced drilling operations, and the effluent oxygen can be vented to the atmosphere. In the preferred embodiment, the effluent oxygen can be bottled and sold to help finance the cost of capital expenditures and drilling operations.

As seen in FIG. 1, air (79% $N_2$, 21% $O_2$) enters the invention from the atmosphere. The air is fed into compressor 102 that pressurizes the air to a suitable pressure to enter mixing chamber 104. Mixing chamber 104 mixes a stoichiometric or other preferable ratio of hydrogen ($H_2$) from storage tank 122 and air from compressor 102. The mixture of hydrogen and air is fed into catalytic reactor 106.

Catalytic reactor 106 is a plug-flow type reactor that allows the deoxygenation reaction to occur. The deoxygenation reaction consumes the hydrogen ($H_2$) and the oxygen ($O_2$) in the inlet feed to produce water ($H_2O$). The nitrogen ($N_2$) passes through the catalytic reactor without reacting with the hydrogen, the oxygen, or the water. The reaction is described as:

The heat of reaction is −1854 kJ/mol of water formed. Thus, for every one percent of oxygen in the volume of gas passing through the catalyst, there is an estimated 300 degree Fahrenheit (° F.) rise in temperature across the catalyst. In the preferred embodiment, the catalyst is platinum. Platinum, however, has a temperature limit of 1300° F. under which it is an effective catalyst for the deoxygenation reaction. Due to the platinum limitations and the exothermic properties of the deoxygenation reaction, a heat exchanger is needed to keep the catalyst sufficiently cooled.

A temperature control system is also needed to be installed in the equipment to maintain the catalytic reactor's 106 temperature in a range that is hot enough for the initiation of the reaction and cool enough to protect the catalyst. The temperature control system connects to the catalytic reactor 106 as well as to heat exchanger 108, to regulate the temperature of the catalyst through a feedback loop. The catalytic reactor 106 will initially be heated by resistance heaters to a temperature hot enough for the reaction to begin (approximately 200° F.). Once the reaction begins, the generated heat of reaction will be sufficient to maintain the continued deoxygenation reaction. To prolong the platinum catalyst's life, the temperature control system will use heat exchanger 108 to maintain the catalytic reactor's 106 temperature within an appropriate temperature range (approximately 200-1000° F.). The preferred embodiment also provides for safety controls to be installed that will shut down the reaction process if the safety limits are exceeded.

Heat exchanger 108 cycles a cooling fluid through catalytic reactor 106. The cooling fluid is then fed back into heat exchanger 108 where the cooling fluid passes through a series of tubes. A fan underneath the tubes cools the tubes and, therefore, the fluid inside the tubes. Alternative to heat exchanger 108, persons of ordinary skill in the art will appreciate that the present invention can be configured with other types of heat exchangers such as a shell and tube type heat exchanger, a plate fin heat exchanger, or a bayonet type heat exchanger. Persons of ordinary skill in the art are aware of other types of heat exchangers other than those described herein.

In an alternative embodiment, the present invention may also be configured with an electrical generator, such as a steam turbine, that is connected to the heat exchanger. In this embodiment, the heat from the exothermic reaction in catalytic reactor 106 can be used to generate electricity. The electricity may be used to run electrolyzer 118, any other equipment of the present invention, or the drilling operations at the well site.

The effluent from catalytic reactor 106 is a stream of water and nitrogen. The water and nitrogen stream passes into dryer 110. Dryer 110 condenses the water out of the nitrogen and water stream. Dryer 110 is preferably connected to heat exchanger 111. However, in alternative embodiments, dryer 110 may also be a chemical dryer or a condenser. Persons of ordinary skill in the art are aware of other types of dryers 110.

Heat exchanger 111 cycles a cooling fluid through dryer 110. The cooling fluid is then fed back into heat exchanger 111 where the cooling fluid passes through a series of tubes. A fan underneath the tubes cools the tubes and, therefore, the fluid inside the tubes. Alternative to heat exchanger 111, persons of ordinary skill in the art will appreciate that the present invention can be configured with other types of heat exchangers such as a shell and tube type heat exchanger, a plate fin heat exchanger, or a bayonet type heat exchanger. Persons of ordinary skill in the art are aware of other types of heat exchangers other than those described herein.

The nitrogen gas from dryer 110 is stored in storage tank 112. When needed for under balanced drilling operations, the nitrogen is compressed in compressor 114 and sent down the well bore to the under balanced drilling equipment. Persons of ordinary skill in the art are aware of various types of under balanced drilling equipment that require nitrogen. The nitrogen may also be used for any other type of drilling and/or production operations. Persons of ordinary skill in the art are aware of other needs for nitrogen gas at the well site including cleaning out the well bore and enhancing the production of hydrocarbons such as oil and gas.

The water effluent from dryer 110 is stored in storage tank 116. Depending on the efficiency and throughput rate of catalytic reactor 106 and electrolyzer 118, storage tank 116 may need to be periodically recharged with water. Persons of ordinary skill in the art will appreciate that storage tank 116 may need to be periodically recharged with water for other reasons including start-up the present invention. The water then passes to electrolyzer 118. Electrolyzer 118 passes an electrical current through water in a process called electrolysis. The electrical current breaks the water molecule bonds and produces gaseous hydrogen at the cathode and gaseous oxygen at the anode. The reaction can be described as:

$$2H_2O(g) + electricity \rightarrow 2H_2(g) + O_2(g)$$

The oxygen is collected at the anode and is stored in storage tank 120. The oxygen may then be bottled and packaged for sale to the public. Alternatively, the oxygen from electrolyzer 118 may be vented to the atmosphere. Electrolyzer 118 may be powered by electricity or by a solar panel. In an alternative embodiment, electrolyzer 118 is powered by electricity generated from the heat generated by the exothermic reaction of catalytic reactor 106.

The hydrogen from electrolyzer 118 is captured at the cathode and stored in storage tank 122. Depending on the efficiency and throughput rate of catalytic reactor 106 and electrolyzer 118, storage tank 122 may need to be periodically recharged with hydrogen. Persons of ordinary skill in the art will appreciate that storage tank 122 may need to be periodically recharged with hydrogen for other reasons including start-up the present invention. The hydrogen in storage tank 122 is then recycled into mixing chamber 104. A compressor (not shown) may be implemented between storage tank 122 and mixing chamber 104 to pressurize the hydrogen prior to entering mixing chamber 104.

The equipment of the present invention may be sized according to the desired flow of nitrogen or oxygen out of the present invention. In an embodiment producing 4.88 lb/min (79 mol/min) of nitrogen gas, the process flow streams are depicted in table 1 below:

TABLE 1

| Stream | Phase | Total Flow (mol/min) | $N_2$ (mol/min) | $O_2$ (mol/min) | $H_2$ (mol/min) | $H_2O$ (mol/min) |
|---|---|---|---|---|---|---|
| A | Gas | 100 | 79 | 21 | 0 | 0 |
| B | Gas | 142 | 79 | 21 | 42 | 0 |
| C | Gas | 121 | 79 | 0 | 0 | 42 |
| D | Gas | 79 | 79 | 0 | 0 | 0 |
| E | Liquid | 42 | 0 | 0 | 0 | 42 |
| F | Gas | 21 | 0 | 21 | 0 | 0 |
| G | Gas | 42 | 0 | 0 | 42 | 0 |

The stream identification letters A through G correspond to the circled letters in FIG. 1.

The present invention uses hydrogen as reducing gas in the deoxygenation reaction of the present invention. While hydrogen is the preferred reducing gas, persons of ordinary skill in the art are aware of other reducing gases that are usable in the present invention. For example, gaseous hydrocarbons such as methane, ethane, propane, and butane may be used in the present invention. Persons of ordinary skill in the art are aware of other reducing gasses that may be used in the present invention.

Figure 2:
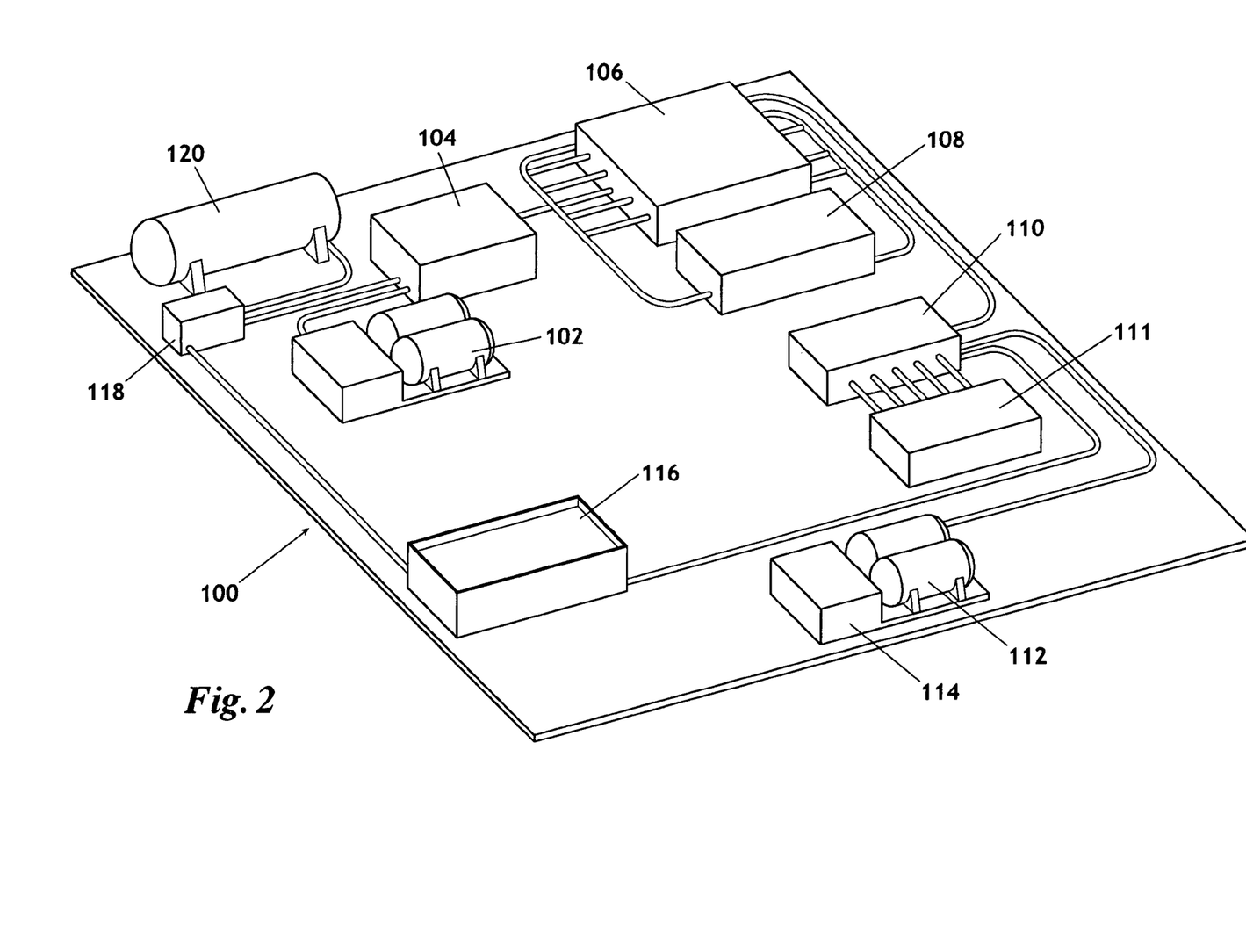
FIG. 2 is an illustration of a physical diagram of the present invention.

FIG. 2 depicts the present invention on a skid 100. Placement of the equipment of the present invention on a skid 100 is preferable for well site operations because skid 100 containing the present invention may be loaded onto a truck and moved from one location to another.

Figure 3:
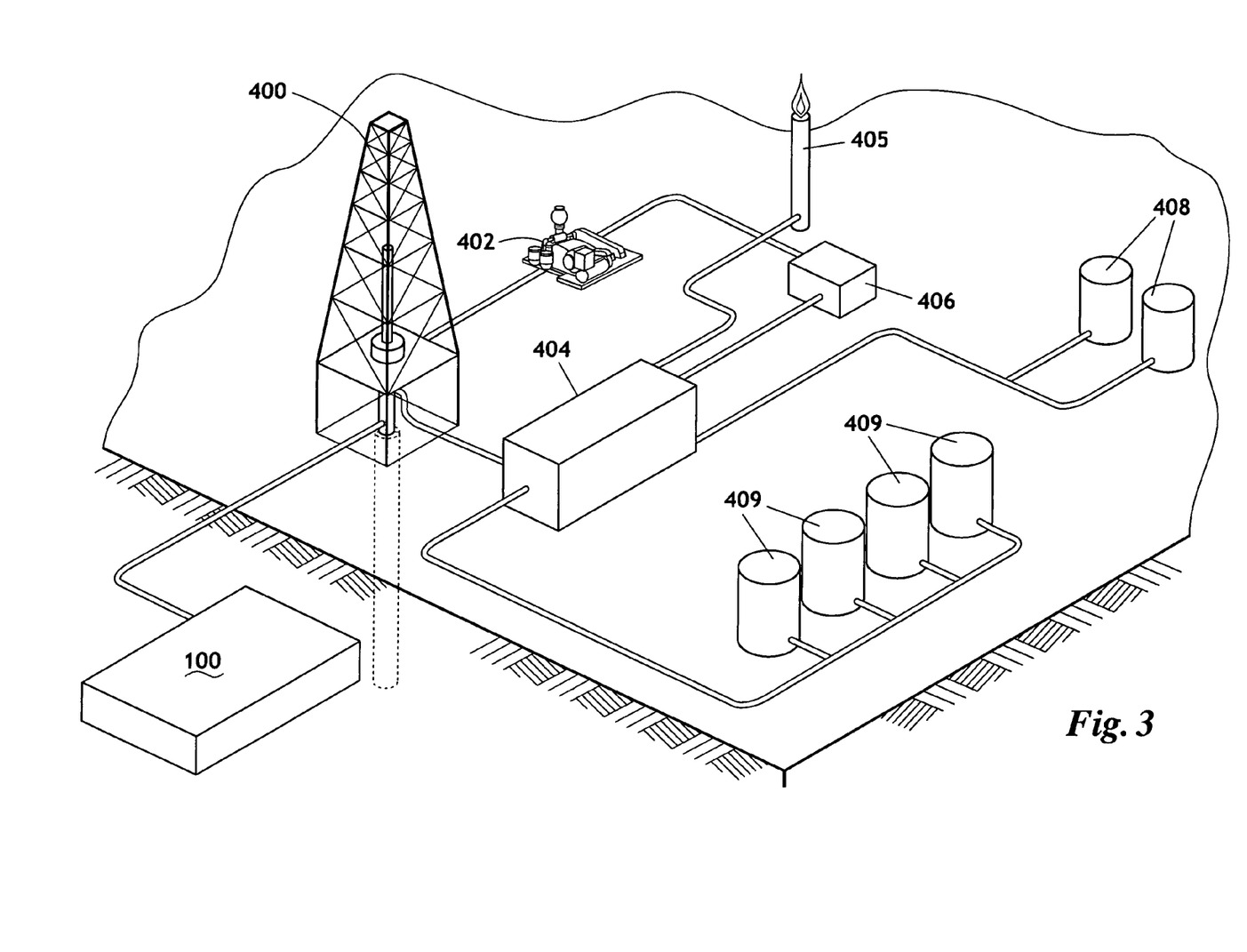
FIG. 3 is an illustration of a well site utilizing the present invention.

FIG. 3 depicts the surface equipment that is needed to drill an under balanced well using the present invention. Some of the equipment shown such as drilling derrick 400, drilling fluid pump 402, and mud tank/solids control equipment 406 are used in most conventional drilling operations. Other equipment for under balanced drilling, such as four-phase (oil, water, cuttings, and gas) separator 404, flare stack 405, oil storage tanks 409, and drilling fluid storage tanks 408, are also shown. Skid 100 is located sufficiently close to the other surface equipment so that the nitrogen from the present invention can be used in under balanced drilling.

Figure 4:
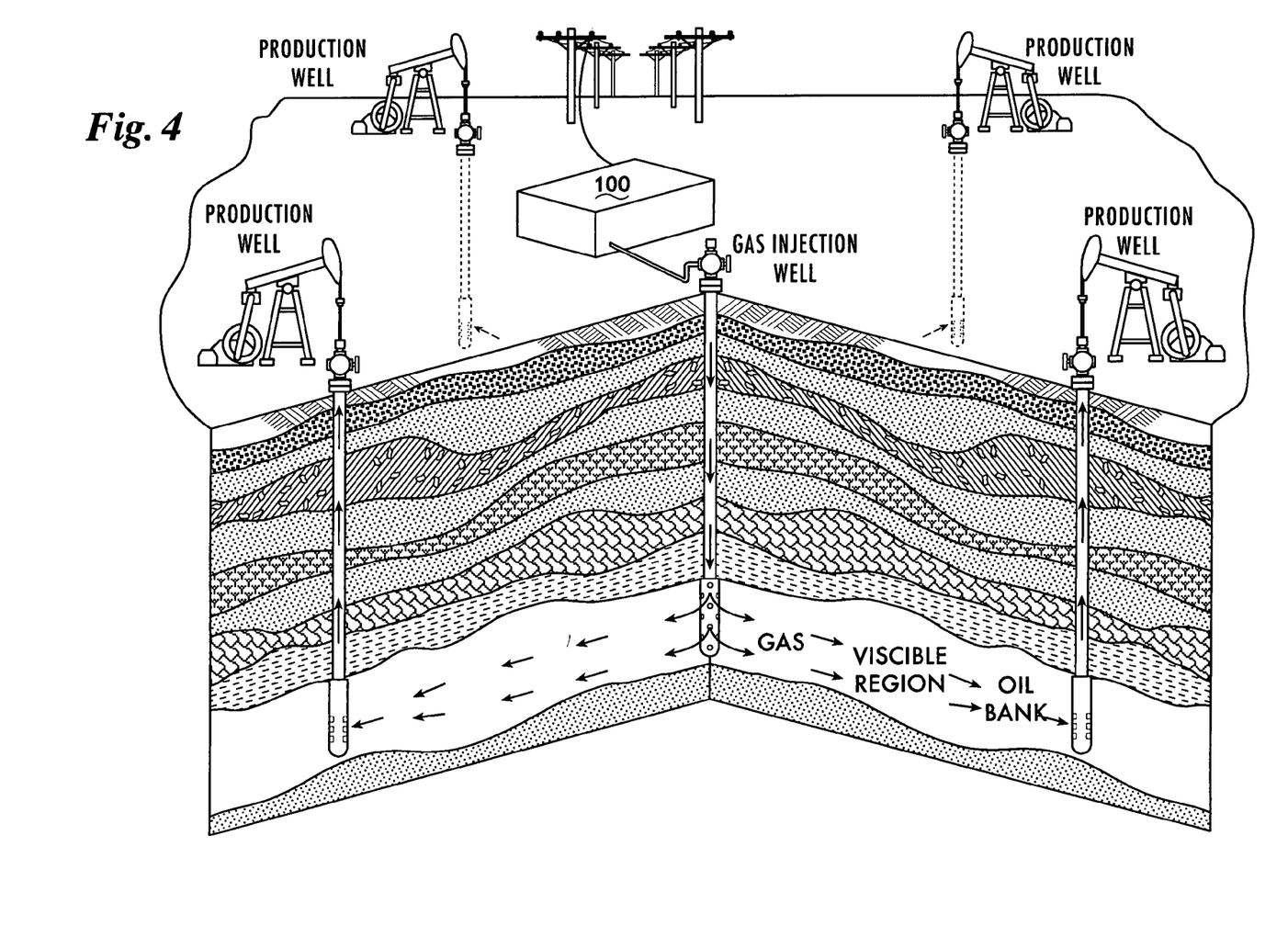
FIG. 4 is an illustration of secondary reservoir recovery using the present invention.

FIG. 4 is an illustration of the process of secondary reservoir recovery using the present invention. Skid 100 produces nitrogen that is injected into the reservoir through a gas injection well. The gas permeates through the viscible regions of the formation and pushes the oil towards the producing wells. The oil may then be pumped to the surface using the production wells. Persons of ordinary skill in the art are aware of how to configure a plurality of wells for secondary recovery when a source of nitrogen gas, such as skid 100, is present.

Figure 5:
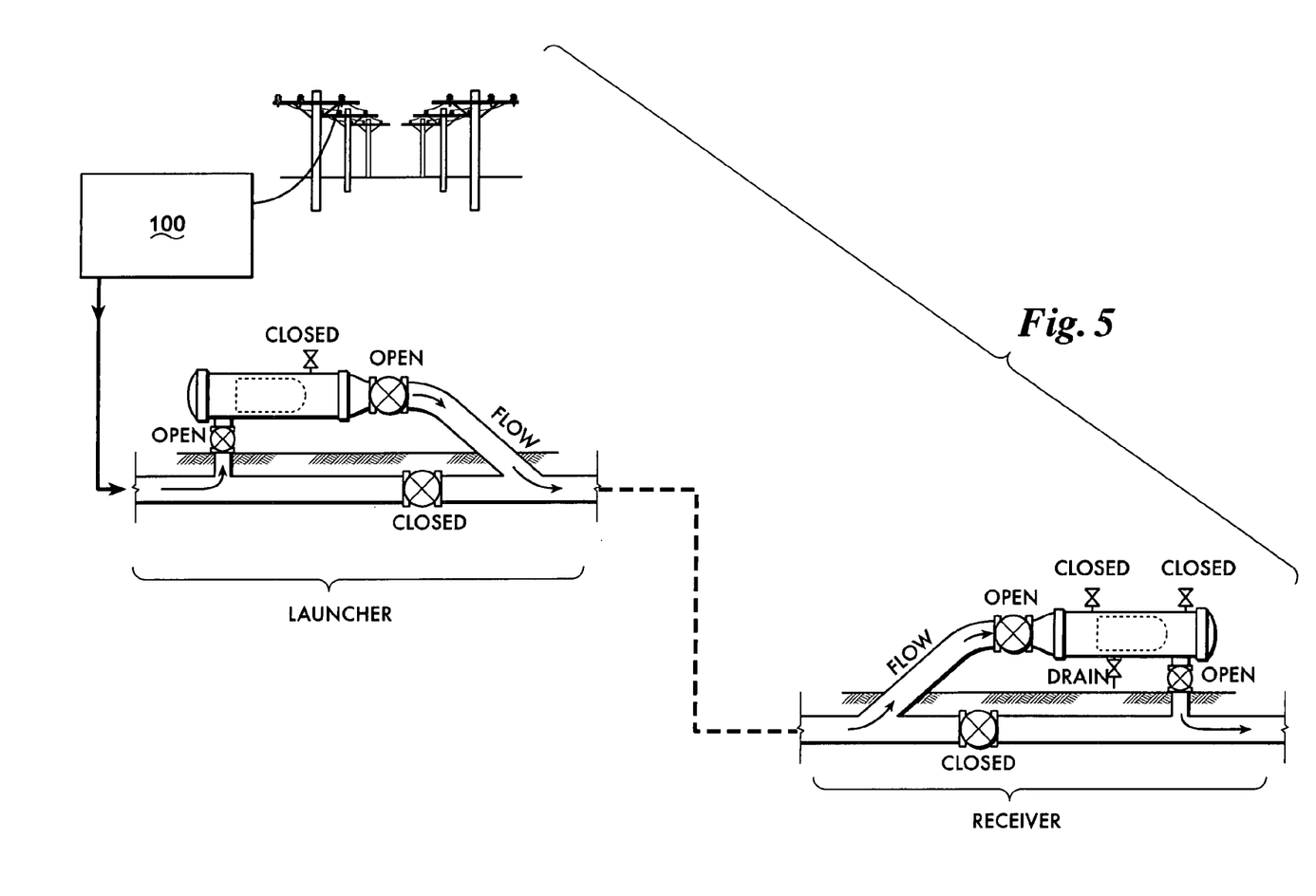
FIG. 5 is an illustration of the pipeline cleaning apparatus using the present invention.

FIG. 5 is an illustration of the pipeline cleaning apparatus using the present invention. Skid 100 produces nitrogen that is injected into the pipeline behind a cleaning device called the pig. The nitrogen gas forces the pig through the pipeline where the pig cleans the inside of the pipeline. The pig is captured at a receiver station. Persons of ordinary skill in the art are aware of how to clean a pipeline with a pig when a source of nitrogen gas, such as skid 100, is present.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for producing nitrogen for a well site operation, the method comprising:
   mixing air and a reducing gas to obtain an inlet gas;
   wherein the air comprises oxygen and nitrogen;
   feeding the inlet gas into a reactor;
   in a reactor, reacting the reducing gas with the oxygen in the air to substantially eliminate the oxygen, thereby producing an effluent gas comprising nitrogen and water;

separating the nitrogen in the effluent gas from the water in the effluent gas; and
using the nitrogen in a well site operation.

2. The method of claim 1 further comprising:
separating the water in the effluent gas into a hydrogen gas and an oxygen gas;
selling the oxygen gas; and
recycling the hydrogen gas into the inlet gas.

3. The method of claim 2 wherein the separation of the hydrogen gas and the oxygen gas from the water is by electrolysis.

4. The method of claim 1 further comprising:
separating the water into a hydrogen gas and an oxygen gas; and
selling or venting the oxygen gas.

5. The method of claim 4 wherein the separation of the hydrogen gas and the oxygen gas from the, water is by electrolysis.

6. The method of claim 1 wherein the reaction between the reducing gas and the oxygen is a catalyzed reaction.

7. The method of claim 6 wherein the catalyst is platinum.

8. The method of claim 1 wherein the reaction between the reducing gas and the oxygen is a deoxygenation reaction.

9. The method of claim 1 wherein the reactor maintains a temperature high enough to support the reaction and low enough to prevent damage to the catalyst.

10. The method of claim 2 wherein the reactor maintains a temperature between approximately 200° F. and approximately 1000° F.

11. The method of claim 1 wherein the reducing gas is hydrogen.

12. The method of claim 1 wherein the reducing gas is a gaseous hydrocarbon.

13. The method of claim 1 wherein the well site operation is drilling.

14. The method of claim 1 wherein the well site operation is under balanced drilling.

15. The method of claim 1 wherein the well site operation is production.

16. The method of claim 1 wherein the well site operation is secondary recovery.

17. The method of claim 1 wherein the well site operation is pipeline cleaning.

18. The method of claim 1 wherein a heat exchanger is used to regulate the temperature of the reactor.

19. The method of claim 18 wherein the heat exchanger is an air cooler.

20. The method of claim 1 wherein the nitrogen in the effluent gas is separated from the water in the effluent gas using a dryer.

21. The method of claim 20 wherein the dryer is a heat exchanger.

22. The method of claim 20 wherein the dryer is a chemical dryer.

23. The method of claim 1 wherein the heat from the reaction between the reducing gas and the oxygen is used to produce electricity.

* * * * *